United States Patent
Eluri et al.

(10) Patent No.: US 10,678,772 B2
(45) Date of Patent: Jun. 9, 2020

(54) SPARSE INFRASTRUCTURE FOR TRACKING AD-HOC OPERATION TIMESTAMPS

(71) Applicant: SAP SE, Walldorf (DE)

(72) Inventors: Amarnadh Sai Eluri, Pleasanton, CA (US); Anupam Mukherjee, San Francisco, CA (US); Andreas Tonder, Walldorf (DE); Vimal Chandran Satheesh, San Francisco, CA (US)

(73) Assignee: SAP SE, Walldorf (DE)

( * ) Notice: Subject to any disclaimer, the term of this patent is extended or adjusted under 35 U.S.C. 154(b) by 206 days.

(21) Appl. No.: 15/980,974

(22) Filed: May 16, 2018

(65) Prior Publication Data

US 2019/0354620 A1     Nov. 21, 2019

(51) Int. Cl.
*G06F 16/23*     (2019.01)
*G06F 12/02*     (2006.01)
*G06F 12/06*     (2006.01)

(52) U.S. Cl.
CPC ...... *G06F 16/2322* (2019.01); *G06F 12/0253* (2013.01); *G06F 12/0646* (2013.01); *G06F 16/2365* (2019.01); *G06F 16/2379* (2019.01); *G06F 2212/1044* (2013.01); *G06F 2212/163* (2013.01)

(58) Field of Classification Search
CPC ............... G06F 16/2322; G06F 2212/1044
See application file for complete search history.

(56) References Cited

U.S. PATENT DOCUMENTS

| | | | |
|---|---|---|---|
| 2016/0147448 A1 | 5/2016 | Schreter et al. | |
| 2016/0147449 A1 | 5/2016 | Andrei et al. | |
| 2016/0147811 A1* | 5/2016 | Eluri | G06F 16/2228 707/694 |
| 2016/0147814 A1* | 5/2016 | Goel | G06F 16/2358 707/600 |

OTHER PUBLICATIONS

Extended European Search Report, dated Sep. 11, 2019, for European Patent Appl. No. 19174553.8, 10 pages.

* cited by examiner

*Primary Examiner* — William Spieler
(74) *Attorney, Agent, or Firm* — Sterns, Kessler, Goldstein & Fox P.L.L.C.

(57) ABSTRACT

Disclosed herein are system, method, and computer program product embodiments for managing timestamp information in memory systems. In an embodiment, an infrastructure may utilize a controller to manage sparse timestamp blocks. These sparse timestamp blocks may manage timestamp information in a persistent memory structure. Controller 110 may utilize a transient timestamp accessor to map the timestamp information for faster hash lookups. Controller 110 may also utilize a garbage collection map as a bitmap to further save processing steps. Controller 110 may utilize the sparse timestamp blocks, transient timestamp accessor, and garbage collection map to efficiently store timestamp data and to quickly retrieve the stored timestamp data.

23 Claims, 8 Drawing Sheets

SPARSE INFRASTRUCTURE FOR TRACKING AD-HOC OPERATION TIMESTAMPS

BACKGROUND

Designers of database management systems often employ snapshot isolation techniques to ensure that users are able to read consistent data while data is modified by concurrent transactions. For each data record, snapshot isolation systems track commit timestamps of inserted and deleted transactions. These transaction commit timestamp values along with snapshot timestamps are used to return consistent data to clients. Snapshot isolation aids in preventing the scenario where someone is reading from a database at the same time as someone else is writing to it, causing the reader to see a half-written or inconsistent piece of data.

Snapshot isolation techniques are often implemented by maintaining multiple versions of data records. One such technique is multi-version concurrency control (MVCC). Under MVCC, a new version of a database object is generated each time the object is written. When a client reads the object, the database management system may return the last relevant versions of the object. MVCC generally keeps multiple copies of each data item. Users connected to the database then see a snapshot of the database at a particular instant in time. Changes made by a writer may not be seen by other users of the database until the changes have been completed (i.e., until the transaction has been committed). MVCC uses timestamps to organize these transactions. Often, MVCC correlates the data of the database to a first timestamp block related to insertions and a second timestamp block related to deletions (if the data record is deleted) based on row number. This correlation, however, may result in inefficient memory allocation based on the process for tracking insertions and deletions. Further, inefficient memory allocation may occur especially with delete commit timestamps due to their ad-hoc nature.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Figure 1A:
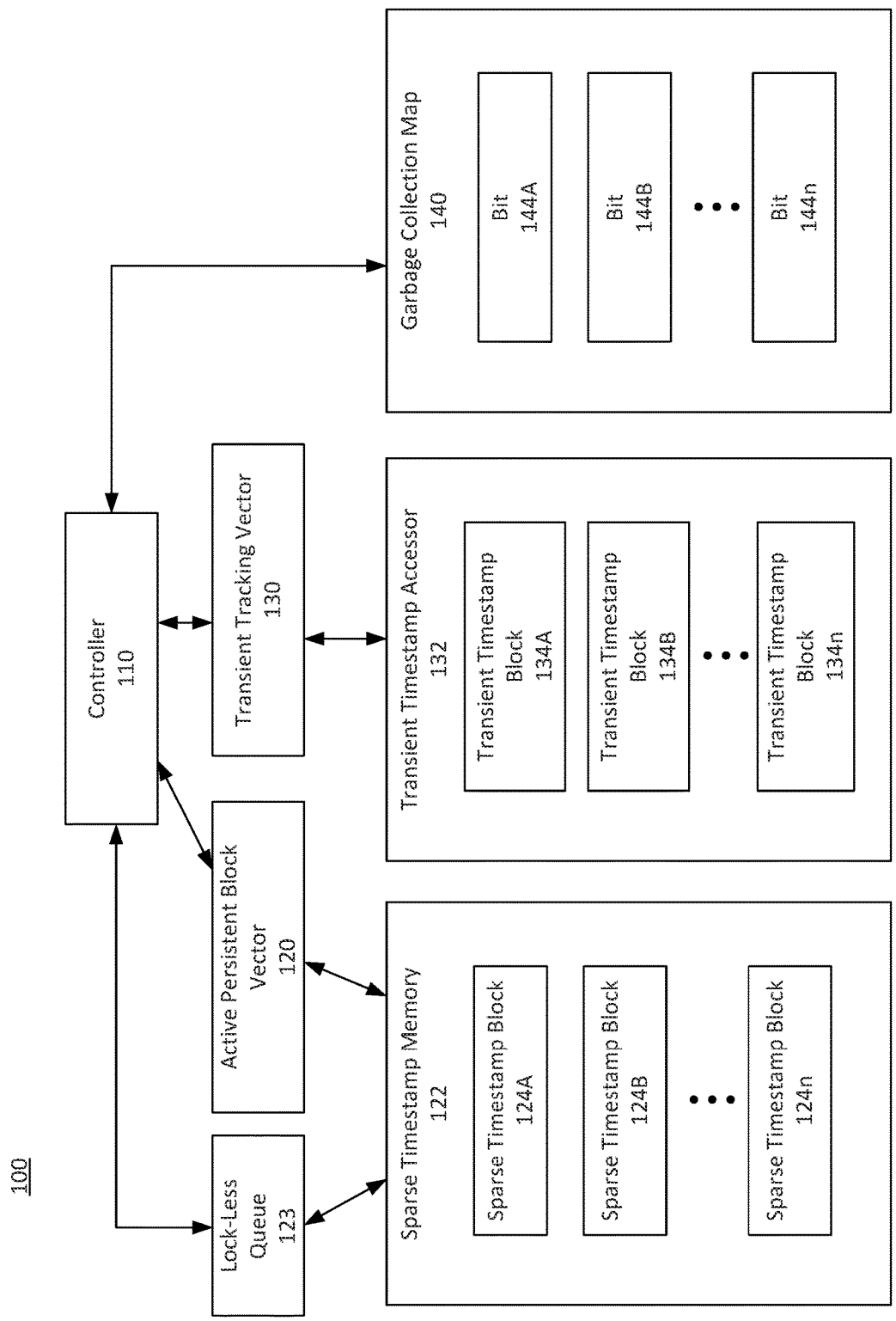
FIG. 1A depicts a block diagram of an infrastructure, according to some embodiments.

Provided herein are system, apparatus, device, method and/or computer program product embodiments, and/or combinations and sub-combinations thereof, for tracking operations in memory systems, such as but not limited to snapshot isolation systems.

Generally, a hash based memory optimized minimally locking infrastructure may track deletion and/or insertion timestamps to utilize less memory relative to other methods of operation. For example, a database system may include a database having a billion rows. Under some approaches, the database system may utilize two timestamp values to track operations related to the rows. These timestamp values may be (1) an insertion timestamp and (2) a deletion timestamp. In an embodiment, both timestamps may be hidden columns corresponding to the data rows. These hidden columns may be arrays of blocks having fixed storage space and may be indexed by their row number.

For example, insertion timestamps may be organized into insertion timestamp blocks. Each insertion timestamp block may be include, for example and without limitation, 1024 entries that correspond to rows of the database. For example, a first insertion timestamp block may represent rows [0-1023] of the database while a second insertion timestamp block may represent rows [1024-2047] of the database. In this manner, when the database management system receives an insertion to row 1025 of the database, the database system may store an insertion timestamp in the second insertion timestamp block at offset "1." This offset may represent the number of rows away from the initial row of the block. In another example, if an insertion is made at row 1200 of the database, the database system may recognize that the second insertion timestamp block is used again and the offset is "176." The database system may then insert the timestamp at the 176 offset space of the second insertion timestamp block. In this manner, the rows of the insertion timestamp blocks may serve in one-to-one correspondence with the rows of the database.

In another aspect, the insertions into the database may insert a range of rows, such as, for example, rows 100-200. In the example from above, offset values of 100-200 of the first insertion timestamp block may be filled with the timestamp representing the insertion of data into rows 100-200 of the database.

Similarly, deletion timestamps may operate using deletion timestamp blocks. For example, if row 5 is deleted from the database, the database management system may write a deletion timestamp into a first deletion timestamp block that represents rows [0-1023] of the database. In this manner, the database system may utilize three structures: (1) the database, (2) insertion timestamp blocks, and (3) deletion timestamp blocks. Rows from both the insertion and deletion timestamp blocks may correspond to rows of the database. In an embodiment, this row-to-row correspondence in timestamp blocks is referred to as a "dense timestamp block" configuration.

Dense timestamp block configurations may be suited when rows are inserted or increased monotonically. That is, as the database grows, the insertion of rows in the database may be suited to an increase in the number of insertion timestamp blocks that track insertion timestamps. Using dense timestamp blocks for deletions, however, may yield inefficiencies.

For example, consider a table or database having 5000 rows and row numbers 1000, 2000, and 4500 are deleted. Based on the dense timestamp block configuration discussed previously, at least three deletion timestamp blocks would be needed to track the deletion timestamps: a first block representing rows [0-1023], a second block representing rows [1024-2047], and a third block representing rows [4096-

5119]. This deletion would result in three dense deletion timestamp blocks (i.e., memory capable of fitting 3072 timestamp entries) allocated for only three deletion timestamps. In this manner, the dense timestamp block configuration yields wasted memory allocation. This waste may be further compounded when database rows extend to the billions or trillions with ad-hoc update and delete operations as seen in many modern systems.

To reduce this wasted memory, the embodiments disclosed herein seek to provide a memory tracking infrastructure that efficiently utilizes memory storage space, reduce the impact on access methods (such as, for example, ad-hoc or range access using row numbers or table scans), and allow for migration from older systems having dense timestamp blocks to sparse timestamp blocks. The embodiments further seek to produce minimal impact on bulk operations (such as bulk updates, bulk deletions, and bulk reads) that access significant portions of database records.

In an embodiment, a database management system may utilize sparse timestamp blocks to track deletion and/or insertion timestamps. For example, a deletion sparse timestamp block may replace a deletion dense timestamp block. An insertion sparse timestamp block may replace an insertion dense timestamp block. For convenience, this disclosure may sometimes discuss sparse timestamp blocks in terms of deletion timestamps, but sparse timestamp blocks may be used interchangeably with insertion timestamps as well. In some embodiments, a deletion of a database entry may represent the insertion of null or zero values into a database row and may therefore be seen as similar to an insertion. The resulting deletion timestamp may have the same structure as an insertion timestamp.

A sparse timestamp block may be a block of data configured to store timestamp information. The sparse timestamp block may be a persistent structure where the space allocated for data is smaller and/or much smaller than the range of row numbers associated with the block. For example, a sparse timestamp block with 1K size may represent 128K rows from a table or database. In an embodiment, the size of the sparse timestamp block and/or the size of the represented rows may vary. In an embodiment, a sparse timestamp block differs from a dense timestamp block because the sparse timestamp block may not utilize a one-to-one row mapping. Instead, the sparse timestamp block may include a column or data entry representative of the row number associated with a deletion or insertion. In an embodiment, each row of the sparse timestamp block may include (1) a row number indicating the row number of the database or table that has been edited via an insertion or deletion and (2) a commit timestamp corresponding to the insertion or deletion transaction. The sparse timestamp block may also include a block header that includes information related to the particular timestamp block. An embodiment of the structure of a sparse timestamp block will be discussed further with reference to FIG. 1B.

The use of a sparse timestamp block, along with other components as will be discussed, provides an infrastructure that improves or even optimizes memory usage when tracking operations in memory systems. In an embodiment, the sparse timestamp block structure may aid in ad-hoc operations and/or operations that single out specific rows or groups of rows of a database or table. The sparse timestamp block structure may aid in conserving memory so that it is not wastefully allocated. As will be described further, the other components of the infrastructure may also lead to comparable speeds when accessing information regarding insertion or deletion timestamps of a data record or group of data records. Even further, additional transient memory structures may be utilized to optimize access to commit timestamp information stored in sparse timestamp blocks. In this manner, the transient memory structures may serve as an index to retrieve specific hash structures.

These features will now be discussed with respect to the corresponding figures.

Figure 7:
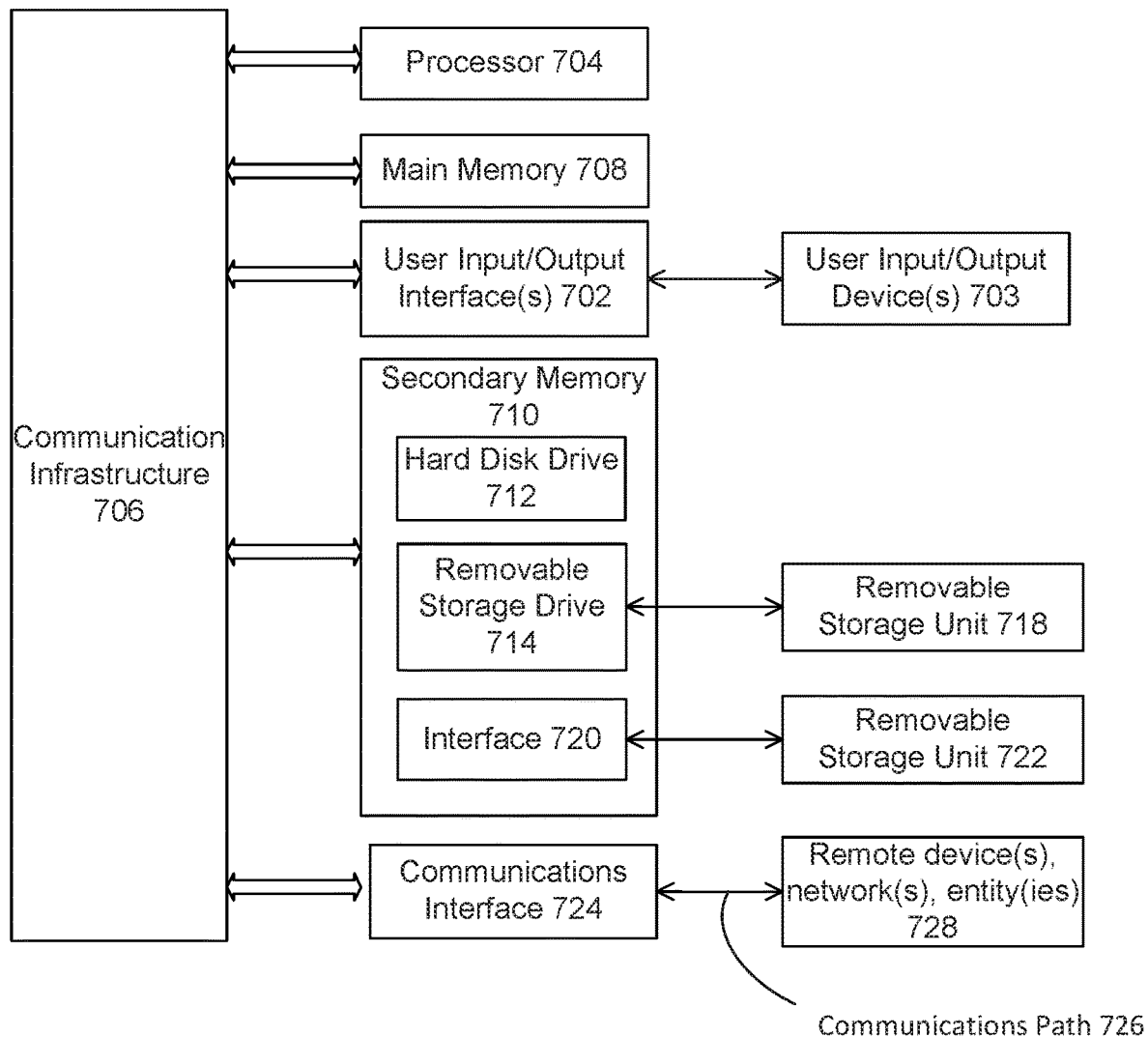
FIG. 7 depicts an example computer system useful for implementing various embodiments.

FIG. 1A depicts a block diagram of an infrastructure 100, according to some embodiments. In an embodiment, infrastructure 100 may be implemented using computer system 700 as depicted in FIG. 7 (which is discussed further below). Infrastructure 100 may be implemented using one or more processors, memory, servers, routers, modems, and/or antennae configured to manage database systems. In an embodiment, infrastructure 100 operates with a database management system to manage timestamp information. The database management system may utilize, for example, concurrency control techniques, snapshot isolation techniques, timestamp-based concurrency control techniques, vector clocks, version control techniques, read-copy-update techniques, and/or multiversion concurrency control (MVCC) techniques. Infrastructure 100 may aid in tracking timestamp information related to insertions, deletions, and/or other types of edits to a database or table.

Infrastructure 100 may include controller 110. Controller 110 may be implemented using one or more processors and/or may include hardware and/or software and may be configured to control the timestamp management process. In an embodiment, infrastructure 100 may be implemented in a database management system and controller 110 may manage edits made to the database as well as timestamp information related to the edits. In an embodiment, controller 110 manages insertions and deletions as well as database queries and/or other database operations.

In an embodiment, controller 110 interfaces with active persistent block vector 120 and/or sparse timestamp memory 122. In an embodiment, sparse timestamp memory 122 may be managed using lock-less queue 123 that tracks the active sparse timestamp blocks 124. For example, the lock-less queue 123 may track all of the sparse timestamp blocks 124 including blocks that are full and/or active entries. In this manner, sparse timestamp blocks 124 need not be ordered. Lock-less queue 123 may link to sparse timestamp blocks 124 in the order of their allocations. In an embodiment, the lock-less queue 123 may maintain an entire table fragment. Active persistent block vector 120 may be a structure external to or within sparse timestamp memory 122. Active persistent block vector 120 may be a vector that tracks active sparse timestamp blocks 124 in sparse timestamp memory 122. Sparse timestamp blocks 124 may be persistent timestamp blocks. Active persistent block vector 120 may index the row numbers associated with sparse timestamp blocks 124. In an embodiment, each slot in the vector may represent a range of rows.

Figure 1B:
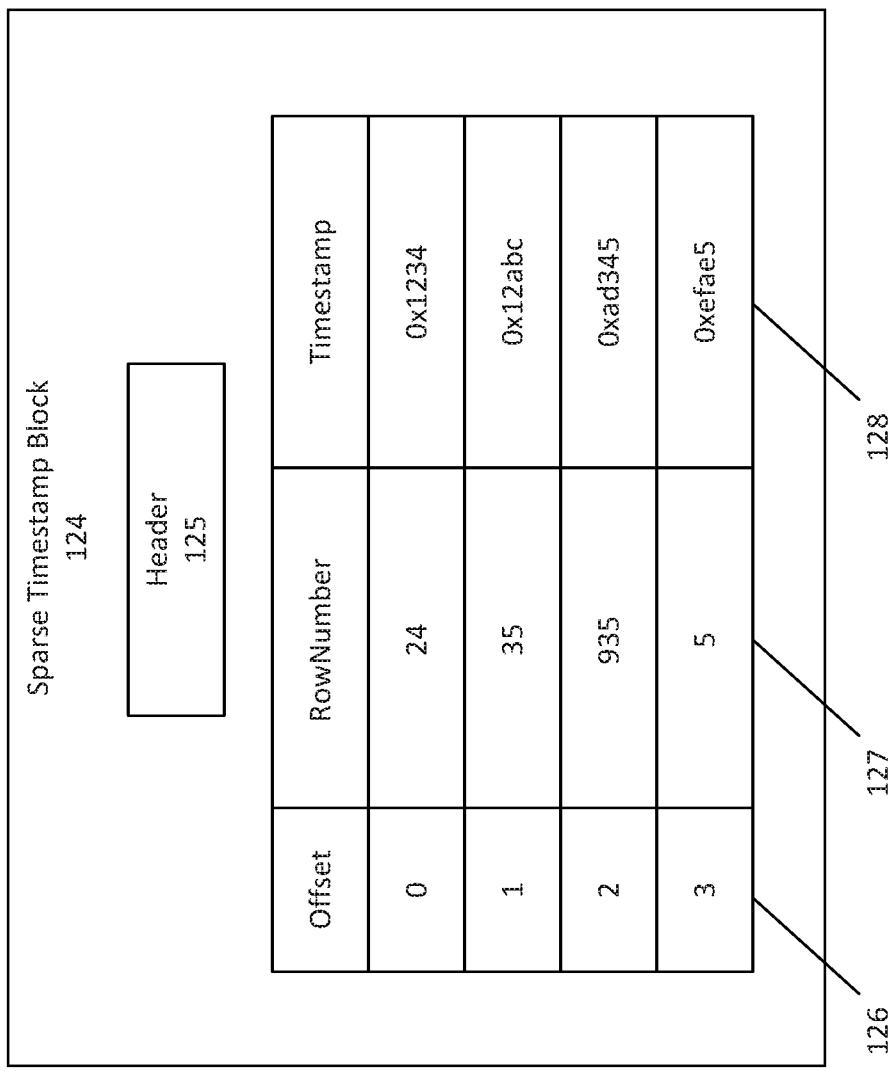
FIG. 1B depicts a block diagram of sparse timestamp block, according to some embodiments.

For example, in an embodiment, sparse timestamp block 124A may utilize a 1K size of memory to represent 128K rows from a table or database. These rows may be rows [0-127999] of the database. Sparse timestamp block 124B may also have a 1K size and represent rows [128000-255999] of the database. When a deletion occurs at row 24 of the database or table, for example, controller 110 may first utilize active persistent block vector 120 to identify the correct sparse timestamp block 124 corresponding to row number 24. In this manner, active persistent block vector 120 may act like a header that identifies the appropriate sparse timestamp block 124 corresponding to the deleted row. In the case of a deletion at row number 24, controller 110 may utilize the indexing information of active persistent block vector 120 that sparse timestamp block 124A corresponds to row number 24. In an embodiment, sparse timestamp block 124A may utilize a 1K size of memory. In an embodiment where row number 2.4 is the first row to include a deletion between rows [0-127999], controller 110 may identify that the first entry offset may represent the position to store the appropriate timestamp. In this manner, as depicted in FIG. 1B, controller 110 may store the row number (row 24) and deletion timestamp at the first offset value (Offset=1) in sparse timestamp block 124A. Based on this storage, controller 110 may update sparse timestamp block 124A to indicate that data has been entered at Offset=1 of sparse timestamp block 124A.

Continuing to another embodiment, controller 110 may detect that a second deletion has occurred at row 35 of the database or table. Controller 110 may then utilize active persistent block vector 120 to recognize that sparse timestamp block 124A is the active sparse timestamp block 124 corresponding to rows [0-127999] of the database. Controller 110 may then identify that the first offset value (Offset=1) has already been occupied with information based on the tracking information provided by active persistent block vector 120 and/or header information of the sparse timestamp block 124A. In an embodiment, controller 110 may utilize atomic operations to determine the appropriate offset position. Using this information, controller 110 may insert a data entry into the second offset position (Offset=2) that indicates a deletion at row number 35 as well as a corresponding deletion timestamp. Controller 110 may then update active persistent block vector 120 and/or the header information of sparse timestamp block to indicate that the second offset position has been filled with information.

This operation may differ from dense timestamp blocks that map rows on a one-to-one basis between the database and the dense timestamp block rows. Using the sparse timestamp block architecture, infrastructure 100 is able to represent more rows while allocating less space in sparse timestamp memory 122. In an embodiment, a sparse timestamp block 124 may utilize a 1K size of memory to represent 128K rows of the database. In the event that more deletions are made in the range from [0-127999] of the database to occupy the entire 1K space associated with a particular active sparse timestamp block 124, controller 110 may allocate another sparse timestamp block 124C as a second sparse timestamp block representative of the [0-127999] range. Active persistent block vector 120 may then identify sparse timestamp block 124C as the newly allocated and active sparse timestamp block. Sparse timestamp block 124C may also utilize a 1K size of memory. Based on this allocation, active persistent block vector 120 may identify sparse timestamp block 124C as the active sparse timestamp block representing the [0-127999] range because non-active sparse timestamp block 124A has been filled with entries. The designation as an active sparse timestamp block indicates to controller 110 the appropriate sparse timestamp block 124 to continue inserting deletion timestamps. That is, in an embodiment, when controller 110 detects another deletion in the range [0-127999], controller 110 may read active persistent block vector 120 to determine that the appropriate block to record the deletion is sparse timestamp block 124C.

In an embodiment, the sparse timestamp blocks 124 need not be sequential in sparse timestamp memory 122. For example, sparse timestamp block 124A may represent row [0-127999] while sparse timestamp block 124B may represent rows [3840000-511999]. In an embodiment, active persistent block vector 120 may contain the active sparse timestamp block 124 ordered based on row number. The design may be flexible for differing amounts of rows, such as, for example, 128K rows, 64K rows, or 32K rows. In an embodiment, this size may be fixed for a database system.

In an embodiment, after storing a row number and timestamp into a sparse timestamp block 124, controller 110 may receive a block identifier and the offset indicating the location in sparse timestamp memory 122 where the row number and timestamp were stored. For example, in an embodiment, controller 110 has stored row number 24 at offset=1 of sparse timestamp block 124A. Controller 110 may then recognize the "124A" as the identifier of the particular sparse timestamp block. Controller 110 may also recognize that the offset corresponding to the stored timestamp is "1". Controller 110 may then store this information (i.e., "124A" and "1") as corresponding to row number 24 in transient timestamp accessor 132.

Transient timestamp accessor 132 includes transient timestamp blocks 134. Transient timestamp blocks 134 include a transient structure and may be implemented using a minimally locked hash table. In an embodiment, access to the timestamp may be restricted while re-sizing the hash table. In an embodiment, transient timestamp blocks 134 may be portions of transient timestamp accessor 132. Like sparse timestamp blocks 124, transient timestamp blocks 134 may include information corresponding to the same row numbers of the database. For example, transient timestamp block 134A may include space for 128K hash entries corresponding to row numbers [0-127999] of the database with the row number being the hash key. Each has entry may include (row number, {sparse timestamp block identifier, offset in the sparse timestamp block}). In this embodiment, having stored timestamp information in sparse timestamp block 124A, controller 110 may store the sparse timestamp block identifier ("124A") and the offset ("1") in transient timestamp block 134A with row number 24.

Transient tracking vector 130 may track the transient timestamp blocks 134 and may act as an index to allow clients requesting information to determine whether a deletion timestamp has been stored in a sparse timestamp block 124. As previously discussed, when controller 110 stores a row number and a deletion timestamp in sparse timestamp block 124, controller may store the corresponding block identifier and offset in transient timestamp accessor 132. Controller 110 may determine the location of storage (i.e., the transient timestamp block 134) based on the row number where the deletion occurred. For example, transient timestamp block 134A may represent rows [0-127999] of the database. If a deletion timestamp was recorded for row 24, controller 110 may insert the block identifier and offset into row 24 of transient timestamp block 134A. This insertion may include a hashing process.

When a client requests access to transient timestamp accessor 132 or requests deletion timestamp information, the client may provide the desired row number to controller 110. Controller 110 may then utilize the received row number to retrieve the hash entry in the corresponding transient timestamp block 134. Controller 110 may then utilize this hash entry to identify the block information and the offset for the particular sparse timestamp block 124. Controller 110 may then read the corresponding deletion timestamp from the sparse timestamp block 124. For example, if controller 110 receives a request for a deletion timestamp for row 24, controller 110 may utilize transient tracking vector 130 to determine that transient timestamp block 134A includes a hash entry corresponding to row 24. The hash entry may indicate that the deletion timestamp information is stored in sparse timestamp block 124A and may be located at offset=1. Controller 110 may then read the information at the appropriate offset and provide the information to the client.

In an embodiment, the structure of a transient timestamp block 134 may differ from the structure of a sparse timestamp block 124. In an embodiment, transient timestamp blocks 134 may utilize a minimally locked hash table. Transient timestamp blocks 134 may represent internal partitions of transient timestamp accessor 132.

In an embodiment, in order to maintain concurrency and reduce the number of memory allocations with multiple writers, the transient timestamp block 134 may utilize a hash table structure using a region-based memory allocator, such as, for example, an arena allocator. Arena allocator may be a memory provider with a special implementation for allocations of fixed-sized structures. This specialization may be wrapped in the arena allocator as a small-sized allocator. This small-sized allocator may allocate a memory block from a system and may be utilized for successive fixed sized structures. For example, the hash entries of the transient timestamp accessor 132 may be fixed in size and may be allocated using a small sized allocator of arena allocator. Once a current memory block is fully utilized, then the small sized allocator may allocate a new block for the system. This arena allocator may provide required memory for hash entries with minimal requests to the system memory provider. In this manner, each transient timestamp block 134 may include its own memory manager. The arena allocator associated with a particular transient timestamp block 134 allows for regular resizing of the particular transient timestamp block 134 along with optimized fixed small sized allocations.

In an embodiment, the small sized allocator may manage a lock-less queue to track any de-allocated (or destroyed) structures. The small sized allocator may use the lock-less queue for the successive allocations of the fixed size structures. Because the deallocated memory is from cached memory block, the memory may be re-used for new allocations without returning the deallocated space to the memory provider. In an embodiment, the arena allocator is configured to deallocate memory when entries of transient timestamp accessor 132 are deleted. The arena allocator may track the memory deallocations and reuse the memory for future allocations. This configuration allows for resizing of the memory utilized by transient timestamp blocks 134 and aids in the efficient usage of memory space while operating on hash entries (e.g., allocating or destroying small sized structures).

In an embodiment, if transient timestamp blocks 134 are partitioned, resizing of a particular transient timestamp block 134 may not interfere with the operations of another transient timestamp block 134. In an embodiment, if minimally locked transient timestamp blocks 134 are partitioned, resizing of a particular partition of transient timestamp block 134 may not interfere with the operations of another partitions of transient timestamp block 134. For example, transient timestamp block 134A may be partitioned into 134A-1 and 134A-2. If partition 134A-1 is being resized, operations such as, for example, insertions, deletions, or reads from partition 134A-2 may still occur.

Regarding the operation of transient timestamp accessor 132, in an embodiment, block identification and offset information may be hashed into a transient timestamp block 134 that corresponds to the same row range as sparse timestamp block 124. For example, sparse timestamp block 124A may cover the range of database rows of [0-127999] while transient timestamp block 134A may also cover the same rows of [0-127999]. By separating these structures, clients may interact with the transient timestamp blocks 134 while controller 110 utilizes the memory saving structure of the sparse timestamp blocks 124. Because transient timestamp accessor 132 exists separately from sparse timestamp memory 122, deletions from transient timestamp blocks 134 (e.g., deleting hash entries due to the rollback of a transaction) may return memory to the particular arena allocator associated with the particular transient timestamp block 134. The arena allocator tracks the memory deallocations and reuses the memory for future allocations while inserting new entries into 134A. The arena allocator may provide a manner of efficiently allocating memory with minimal contention at the system memory provider. Further, transient timestamp accessor 132 provides a structure allowing for a quick determination of whether a particular row has been deleted and/or may be a garbage collected deleted row. For example, if a row 2000 of transient timestamp block 134A does not include hash information pointing to a sparse timestamp block 124, then controller 110 is able to determine that row 2000 of the database has not been deleted.

Similarly, garbage collection map 140 also provides a structure for determining whether a row of the database has been deleted. In an embodiment, garbage collection map 140 may be a lock-less bit vector or bitmap representing a list of garbage collected rows. This structure allows for faster determinations of the rows that are completely invisible to clients accessing a database. In an embodiment, garbage collection map 140 may utilize bits 144 as indicators of whether a deletion has occurred to a particular row of the database. When a deletion has occurred, the bit 144 corresponding to the row that has been deleted may be set to indicate that a row has been deleted. This deletion may correspond to a garbage collection procedure following the recordation of a deletion timestamp in a sparse timestamp block 124.

In an embodiment, garbage collection map 140 may include one or more bit chunks. Each bit chunk may represent a range of row numbers. If a bit chunk for a given row number exists, then the row has been deleted. If a bit 144 within the bit chunk is set, then the row is deleted and garbage has been collected. That is, a reader may not be required to examine transient timestamp accessor 132. In this case, the deletion timestamp value may be zero. This may represent the situation where the row is completely invisible to the clients of the system. Recognizing that a bit 144 is set may allow the system to avoid an examination of the transient timestamp blocks 134 whenever a row is garbage collected and if the bit chunk for a given row number is not allocated.

For example, a deletion timestamp for row 1200 may be inserted into a sparse timestamp block 124. A garbage collection procedure may then occur when the deletion becomes visible to the clients accessing the database. The garbage collection procedure may then replace the timestamp in the sparse timestamp block 124 corresponding to row 1200 with a zero value to indicate that all clients are updated with the deleted row. Garbage collection map 140 then sets a bit 144 corresponding to row 1200 from zero to one to indicate that row 1200 now displays as deleted to all clients. In an embodiment, a default position for bits 144 may be a one and garbage collection map 140 may toggle the bit to zero to represent visibility.

In an embodiment where infrastructure 100 tracks deletions, garbage collection map 140 may set a bit 144 when a deletion timestamp becomes zero to indicate that a row has become invisible to all clients. In an embodiment where infrastructure 100 tracks insertions, garbage collection map 140 may set a bit 144 when an insertion timestamp becomes zero to indicate that a row has become visible to the clients. In an embodiment, bits 144 of garbage collection map 140 are set when timestamps are set to zero.

In an embodiment, garbage collection map 140 may utilize a one-to-one correlation of bits 144 to row numbers of a database. For example, bit 144A may represent row [0] while bit 144B may represent row [1].

In an embodiment, bits 144 may be grouped in a manner corresponding to database rows. For example, portions of bits may be grouped similarly to a sparse timestamp block 124 and may operate using block identifiers and offset values. In an embodiment, a first portion of bits 144 may correspond to rows [0-1023] of the database while a second portion of bits 144 may correspond to rows [1024-2047]. Controller 110 may read the first portion of bits 144 to determine whether a deletion has occurred in any of the rows.

In an embodiment, bit chunks of the garbage collection map 140 may include bits 144 corresponding to the range of row numbers associated with the bit chunk. For example, a bit chunk may include 1024 bits 144 that correspond to 1024 rows. If row 1500 is accessed, a second bit chunk may be accessed. If no second bit chunk exists, in an embodiment, none of the rows in range [1024 to 2047] are deleted. If the second bit chunk exists and bit value 476 is set, then row number 1500 is invisible to the clients of the system. If the bit value 476 is zero, then the system may retrieve the deletion timestamp using transient timestamp accessor 132. If no entry for row number 1500 exists in transient timestamp accessor 132, then the row is not deleted. If an entry exists, then persistent block information may be retrieved from the corresponding transient timestamp block 134. Using the persistent block information, the timestamp may be retrieved from sparse timestamp memory 122. In an embodiment, using the garbage collection map 140 may improve read performance by eliminating a lookup into a hashtable associated with transient timestamp accessor 132.

Garbage collection map 140 may aid in range scans and may be used to quickly determine if a row has been deleted or if the row is a garbage collected deleted row (i.e. an invisible row). In an embodiment, using garbage collection map 140 may save a processing step and allow controller 110 from checking transient timestamp accessor 132 for some rows. For example, if a client requests deletion information regarding row 1520 and bits 144 correspond to row numbers, controller 110 may check the bit 144n corresponding to row 1520. If the bit 144n is set to one, a deletion timestamp has been garbage collected in sparse timestamp block 124 (i.e., timestamp value is zero). In an embodiment, by quickly checking garbage collection map 140, controller 110 need not scan transient timestamp accessor 132 because garbage collection map 140 has already indicated a timestamp of zero. This procedure may save one or more processing steps.

In an embodiment, if controller 110 detects that bit 144n has not been set, then controller 110 may perform a hash table look-up to retrieve a hash entry. In the previous example, this hash entry may correspond to the desired row number of 1520. Using this hash entry, controller may then determine the block identifier and offset if desired.

Using garbage collection map 140 allows for more efficient range scans that require fewer processing steps. For example, if controller 110 is asked by a client to retrieve all invisible rows from a system, controller 110 may utilize the bitmap structure of garbage collection map 140 to quickly determine the rows.

In an embodiment, a client may request that controller 110 provides the deleted rows. This request may include the invisible rows as well as rows marked with deletion timestamps. In this embodiment, controller 110 may identify the invisible rows using garbage collection map 140. Controller 110 may then utilize transient timestamp accessor 132 to determine the rows that include deletion timestamp values for those rows whose bit chunks are allocated and are not set to 1. In this case, transient timestamp accessor 132 may include null values in the rows not having associated deletion timestamps for those rows whose bit chunks are not allocated. In this manner, controller 110 may be able to quickly identify the rows having deletion timestamps from transient timestamp accessor 132 for the remaining rows having deletion timestamp entries. Utilizing both garbage collection map 140 along with transient timestamp accessor 132 allows controller 110 to quickly identify the relevant rows while reducing steps.

FIG. 11B depicts a block diagram of sparse timestamp block 124, according to some embodiments. Sparse timestamp block 124 may be an embodiment of a portion of sparse timestamp memory 122. Sparse timestamp block 124 may be a persistent structure configured to store timestamp information. In an embodiment, sparse timestamp block 124 may represent a range of database rows greater than the space allocated for the sparse timestamp block 124. For example, sparse timestamp block 124 may include a 1K size of memory to represent 128K rows of a database or table. In an embodiment, entries of each row of the sparse timestamp block 124 may include an offset 126, a row number 127, and/or a timestamp 128. Timestamp 128 may represent an insertion or a deletion timestamp.

In an embodiment, sparse timestamp block 124 may include a header 125. Header 125 may include a starting row number associated with a range of represented rows. For example, if sparse timestamp block 124 represents rows [128000-255999], header 125 may include information indicating that the starting row is 128000. In an embodiment, header 125 may indicate the range represented by sparse timestamp block 124. For example, sparse timestamp block 124A may represent a number of database rows that differs from sparse timestamp block 124B. Sparse timestamp block 124A may represent rows [0-127999] while sparse timestamp block 124B may represent rows [128000-383999]. In this manner, header 125 may include information related to the range of rows represented by sparse timestamp block 124.

In an embodiment, header 125 may include information related to the next available slot in the data area section. Controller 110 may utilize this information to determine the appropriate offset to store a timestamp. For example, if the first three rows of sparse timestamp block 124 include deletion timestamps, controller 110 may read header 125 to determine that the next deletion timestamp should be inserted at the fourth row. In an embodiment, this information may include information related to the current active offset 126.

Offset 126 may indicate an index into entries of sparse timestamp block 124. Header 125 may store information related to an active offset 126, which may represent an offset 126 that does not include a timestamp 128. The active offset 125 may be the next available offset 126 for the insertions into the sparse timestamp block 124. Using the active offset 126, controller 110 may store a timestamp 128. In an embodiment, after controller 110 has stored a row number 127 and timestamp 128 at a particular offset 126, controller 110 may store the particular offset 126 value in transient timestamp accessor 132. Controller 110 may also store a block identifier along with offset 126.

Controller 110 may also utilize the offset 126 value when reading stored row numbers 127 and/or timestamps 128. For example, if a client requests timestamp 128 information corresponding to a particular row number 127, controller 110 may utilize transient timestamp accessor 132 to determine the block identifier and/or offset 126 corresponding to the row. Controller 110 may then identify the particular sparse timestamp block 124 corresponding to the block identifier and may identify the particular offset 126 corresponding to the requested row. Controller 110 may then read the timestamp 128 corresponding to the row.

For example, in an embodiment, a client may request a timestamp corresponding to row number 935. Controller 110 may utilize row number 935 to identify a transient timestamp block 134 corresponding to row number 935. This transient timestamp block 134 may return a block identifier and an offset 126. Using the block identifier, controller 110 may identify the particular sparse timestamp block 124. Controller 110 may then utilize the offset 126 to locate the time stamp. For example, as depicted in FIG. 1B, an offset 126 of "2" may have been provided by the transient timestamp block 134. Controller 110 may then read the content from the offset 126 of "2" and identify row number 127 as "935" and timestamp 128 as "0xad345". Using this information, controller 110 may return the timestamp 128 to the client.

The structure of sparse timestamp block 124 allows for efficient storage of timestamp information relative to a dense timestamp block configuration. Further, use of header 125 and offset 126 may allow for faster identification of requested timestamp information while maintaining a sparse structure. While infrastructure 100 may utilize sparse timestamp blocks 124, in an embodiment, infrastructure 100 may utilize a mix of sparse timestamp blocks 124 as well as dense timestamp blocks to achieve a desired memory architecture. In an embodiment, the dense timestamp blocks may be associated with an old table persistency, for example, when the old table is created in a version prior to the sparse timestamp blocks version. In this case, headers 125 may include information indicating whether a particular block is a sparse timestamp block 124 or a dense timestamp block.

In an embodiment, while loading a table created in a prior system version, infrastructure 100 may read the old dense timestamp blocks. For example, if the current system stores deletion timestamps using sparse timestamp blocks 124, the system may read dense deletion timestamp blocks. The system may then insert the timestamp values from the dense timestamp block into respective transient timestamp blocks 134. In this case, the row number is calculated from the dense timestamp block header information and the offset of the active timestamp in the dense timestamp block. Once the row number is computed, (row number, {dense timestamp block identifier, offset}) may be inserted into a transient timestamp block 134. The populated transient timestamp block 134 is used by the controller 120 when extracting a requested timestamp. Controller 120 may use the entry of the transient timestamp block 134 to retrieve entries from the dense timestamp block.

Figure 2:
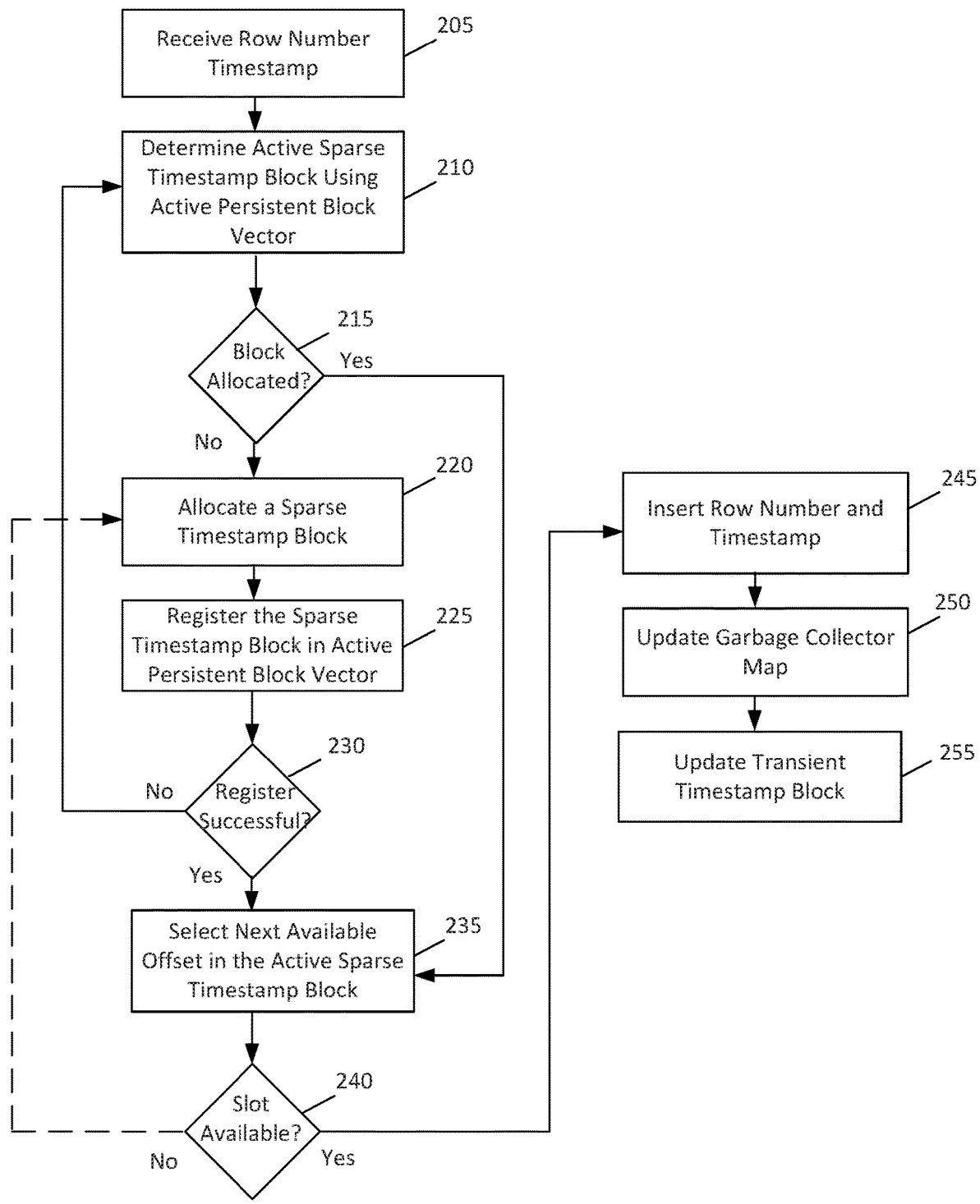
FIG. 2 depicts a flowchart illustrating a method for tracking a timestamp, according to some embodiments.

FIG. 2 depicts a flowchart illustrating a method 200 for tracking a timestamp, according to some embodiments. The timestamp may be, for example, a deletion timestamp for delete operations. Method 200 shall be described with reference to FIG. 1A; however, method 200 is not limited to that example embodiment.

In an embodiment, controller 110 may utilize method 200 to store deletion timestamp information in infrastructure 100. The foregoing description will describe an embodiment of the execution of method 200 with respect to controller 110. While method 200 is described with reference to controller 110, method 200 may be executed on any computing device, such as, for example, the computer system described with reference to FIG. 5 and/or processing logic that may comprise hardware (e.g., circuitry, dedicated logic, programmable logic, microcode, etc.), software (e.g., instructions executing on a processing device), or a combination thereof. Further, while method 200 is described with respect to deletion timestamps, method 200 may further be employed for insertion timestamps.

It is to be appreciated that not all steps may be needed to perform the disclosure provided herein. Further, some of the steps may be performed simultaneously, or in a different order than shown in FIG. 2, as will be understood by a person of ordinary skill in the art.

In an embodiment, at 205, controller 110 may receive a row data transaction information associated with a database row number. For example, the transaction may be a deletion or insertion operation. Controller 110 may be implemented within or separately from a database management system. A client may choose to delete a particular row of a database by sending a command to the database management system and/or controller 110. At 205, controller 110 may receive this command. Controller 110 may then identify a timestamp corresponding to this command. Controller 110 may then store the timestamp in a sparse timestamp block 124.

At 210, based on the row number where the deletion occurred, controller 110 may determine an active sparse timestamp block 124 using active persistent block vector 120. Controller 110 may be internally programmed to identify a block and/or may read information from active persistent block vector 120 to determine the appropriate block. For example, if a deletion occurs at row 128001 while sparse timestamp block 1241 represents rows [0-12999] and sparse timestamp block 124B represents rows [128000-255999], controller 110 may identify sparse timestamp block 124B as the appropriate block to insert the deletion timestamp. In an embodiment, active persistent block vector 120 may indicate a sparse timestamp block 124 that is active and ready to accept additional entries.

At 215, controller 110 may determine whether the identified sparse timestamp block 124 has been allocated. Controller 110 may check information stored in active persistent block vector 120 to determine if a block has been allocated. If a block has been allocated, controller 110 may select the active sparse timestamp block 124 at 235 and select the next available offset. If a block has not been allocated, controller 110 may allocate a sparse timestamp block 124 at 220. A block may not be allocated, for example, in an initialization process. A sparse timestamp block 124 may not yet be allocated and controller 110 may allocate memory for usage at 220. At 225, controller 110 may register the allocated sparse timestamp block 124 in active persistent block vector 120. Registering the allocated sparse timestamp block 124 may designate the particular block as the active block in active persistent block vector 120. Controller 110 may utilize this active status in future insertions of deletion timestamps in a sparse timestamp block 124.

At 230, controller 110 may determine whether the register was successful. If the register was not successful, controller 110 may return to 210 and determine an active sparse timestamp block using active persistent block vector 120. In an embodiment, the failure to register the active sparse timestamp block 124 may indicate an error and that an active sparse timestamp block 124 has already been allocated and designated as active by active persistent block vector 120. In this case, controller 110 may select the active sparse timestamp block at 245.

If the register was successful, controller 110 may execute 235 and select the next available offset in the active sparse timestamp block 124. In an embodiment, the next available slot may be the first slot or offset=0. This insertion of the row number and deletion timestamp may occur for newly allocated sparse timestamp blocks 124 that do not yet include other deletion timestamps. At 240, controller 110 may determine whether a slot is available in the active sparse timestamp block 124. Controller 110 may execute 240 after allocating a new sparse timestamp block 124 or after determining that active persistent block vector 120 indicates that a sparse timestamp block 124 has already been designated as active. At 240, if the active sparse timestamp block 124 does not include an available slot, controller 110 may return to 220 to allocate another sparse timestamp block 124. A slot may not be available when the active sparse timestamp block 124 is full with entries.

If the slot available, controller 110 may allocate another sparse timestamp block 124 at 220. This allocation may represent a second sparse timestamp block 124 representing the same range of rows. For example, controller 110 may identify sparse timestamp block 124A as representing rows [0-127999]. After determining that sparse timestamp block 124A is full or does not include space for additional deletion timestamp information, controller 110 may allocate a second sparse timestamp block 124B to also represent rows [0-127999]. Controller 110 may then update active persistent block vector 120 to register sparse timestamp block 124B as the active sparse timestamp block 124.

Figure 3:
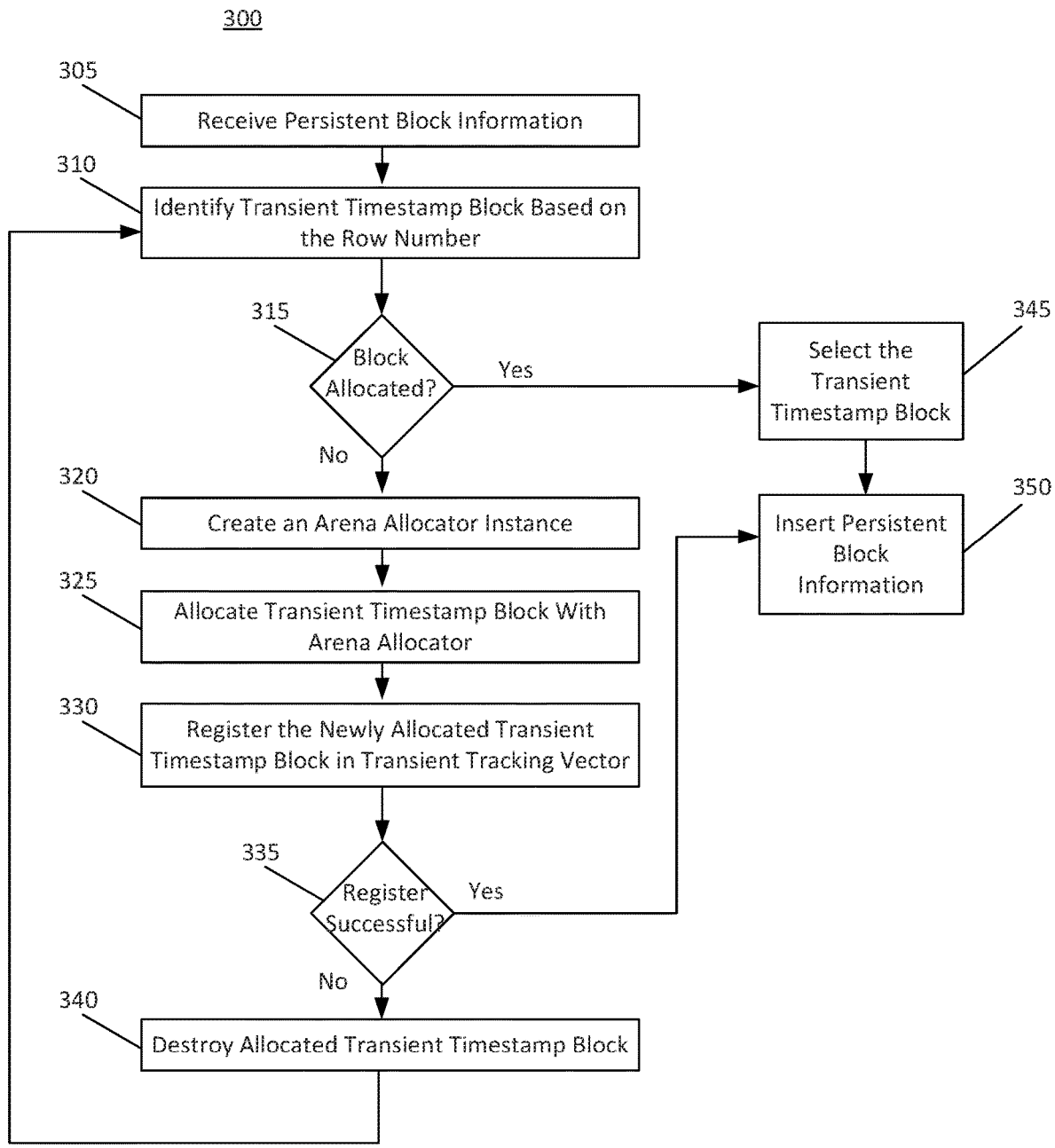
FIG. 3 depicts a flowchart illustrating a method for updating a transient timestamp block, according to some embodiments.

Returning to 240, if a slot is available, controller 110 may execute 245 and insert the row number and timestamp. At 245, controller 110 may insert the row number and timestamp at the next available slot of the active sparse timestamp block 124. At 250, controller 110 may update garbage collector map 140. In an embodiment, controller 110 may reserve and/or allocate a bit chunk from garbage collector map 140 for the given row number. Updating garbage collector map 140 may further include reserving and/or setting one or more bits 144 corresponding to the row number associated with the deletion or insertion. At 255, controller 110 may update a transient timestamp block 134 corresponding to the row number. FIG. 3 provides an embodiment of updating a transient timestamp block 134.

FIG. 3 depicts a flowchart illustrating a method 300 for updating a transient timestamp block 134, according to some embodiments. Method 300 shall be described with reference to FIG. 1A; however, method 300 is not limited to that example embodiment.

In an embodiment, controller 110 may utilize method 300 to update a transient timestamp block 134 in infrastructure 100. The foregoing description will describe an embodiment of the execution of method 300 with respect to controller 110. While method 300 is described with reference to controller 110, method 300 may be executed on any computing device, such as, for example, the computer system described with reference to FIG. 5 and/or processing logic that may comprise hardware (e.g., circuitry, dedicated logic, programmable logic, microcode, etc.), software (e.g., instructions executing on a processing device), or a combination thereof. Further, while method 300 is described with respect to deletion timestamps, method 300 may further be employed for insertion timestamps.

It is to be appreciated that not all steps may be needed to perform the disclosure provided herein. Further, some of the steps may be performed simultaneously, or in a different order than shown in FIG. 3, as will be understood by a person of ordinary skill in the art.

In an embodiment, at 305, controller 110 may receive persistent block information. The persistent block information may include a block identifier and/or an offset. In an embodiment, the persistent block information may take the form of (row number, {timestamp block identifier, offset in the timestamp block}). Controller 110 may receive this information in response to storing a row number and deletion timestamp into a sparse timestamp block 124. The block identifier may indicate the particular sparse timestamp block 124 where the row number and deletion timestamp were stored. The offset may indicate the position and/or slot within the sparse timestamp block 124 where the row number and deletion timestamp were stored.

At 310, controller 110 may identify a transient timestamp block 134 based on the deleted row number. Transient timestamp accessor 132 may be divided into transient timestamp blocks 134 representing portions of the transient timestamp accessor 132. Controller 110 may read information related to this configuration from transient tracking vector 130. In an embodiment, transient timestamp blocks 134 may correspond to the rows represented in sparse timestamp block 124. For example, sparse timestamp block 124A and transient timestamp block 134A may represent rows [0-127999]. If a deletion occurs at row 1200, controller 110 may utilize transient tracking vector 130 to determine that transient timestamp block 134A is the appropriate block.

At 315, controller 110 determines whether a transient timestamp block 134 has been allocated. Controller 110 may check information stored in transient tracking vector 130 to determine if a block has been allocated. If a block has been allocated, controller 110 may select the transient timestamp block 134 at 345. At 350, controller 110 may insert the persistent block information into the selected transient timestamp block 134. In an embodiment, transient timestamp blocks 134 correspond to row numbers of the database. At 350, controller 110 may then insert the sparse timestamp block 124 identifier and offset at the location in transient timestamp block 134 using the row number that has been deleted as the hash key value. This operation may aid in faster retrieval of hash information related to the sparse timestamp blocks 124 because the hash information is retrievable using the row number of the database and the one-to-one mapping to rows of transient timestamp accessor 132.

Returning to 315, if a block has not been allocated, controller 110 may create an arena allocator instance at 320. A block may not be allocated, for example, in an initialization process. A transient timestamp block 134 may not yet be allocated and controller 110 may allocate memory for usage at 320.

At 320, controller 110 may create an arena allocator instance to create a transient timestamp block 134. The structure of the arena allocator may provide the required memory for the created timestamp block 134. The arena allocator may also allow for increased efficiency by using an efficient small sized allocator along with regular allocations. In an embodiment, each transient timestamp block 134 may be created with its own arena allocator. At 325, controller 110 may allocate a transient timestamp block 134 using the arena allocator. At 330, the controller may register the allocation in transient tracking vector 130. Transient tracking vector 130 may be a loss-less vector tracking transient timestamp blocks 134 using atomic operations. This registration may make transient timestamp blocks 134 visible to controller 110 and to clients.

At 335, if the registration is successful, controller 110 may insert the persistent block information at 350. If the registration is unsuccessful, controller 110 may destroy the allocated transient timestamp block 134 at 340. An unsuccessful registration may indicate that an error has occurred. For example, corresponding transient timestamp block 134 may already be allocated. In this case, controller 110 deallocates the attempted creation of another transient timestamp block 134. Controller 110 may execute method 300 again in an attempt to properly insert the persistent block information. For example, controller 110 may execute 310 to identify the already existing transient timestamp block 134.

Figure 4:
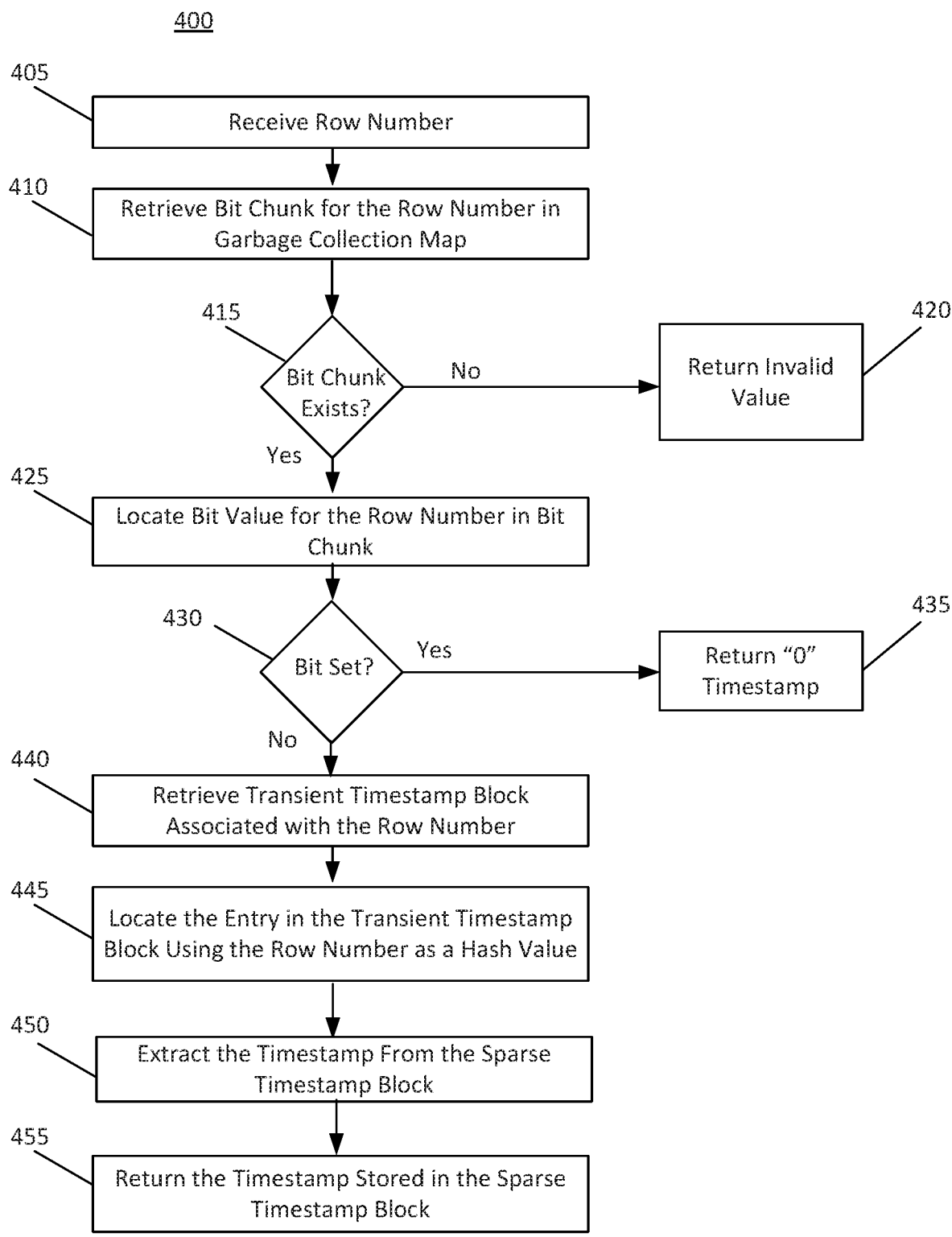
FIG. 4 depicts a flowchart illustrating a method for retrieving a timestamp, according to some embodiments.

FIG. 4 depicts a flowchart illustrating a method 400 for retrieving a timestamp, according to some embodiments. Method 400 shall be described with reference to FIG. 1A; however, method 400 is not limited to that example embodiment.

In an embodiment, controller 110 may utilize method 400 to retrieve a timestamp from a sparse timestamp block 124 in infrastructure 100. The foregoing description will describe an embodiment of the execution of method 400 with respect to controller 110. While method 400 is described with reference to controller 110, method 400 may be executed on any computing device, such as, for example, the computer system described with reference to FIG. 7 and/or processing logic that may comprise hardware (e.g., circuitry, dedicated logic, programmable logic, microcode, etc.), software (e.g., instructions executing on a processing device), or a combination thereof. Further, while method 400 is described with respect to deletion timestamps, method 400 may further be employed for insertion timestamps.

It is to be appreciated that not all steps may be needed to perform the disclosure provided herein. Further, some of the steps may be performed simultaneously, or in a different order than shown in FIG. 4, as will be understood by a person of ordinary skill in the art.

In an embodiment, at 405, controller 110 may receive a row number. Controller 110 may receive a row number from a requesting client. The requesting client may be wanting to read a timestamp associated with the row number.

At 410, controller 110 may read garbage collection map 140 to determine if one or more bits associated with the row number have been set. Controller 110 may retrieve a bit chunk corresponding to the row number from garbage collection map 140. At 415, controller 110 may determine whether a corresponding bit chunk exists. If no bit chunk associated with the row number exists, then the row has not been deleted. Controller 110 may return an invalid value at 420. This invalid value may be a "maximum" value timestamp and/or may indicate that the particular row number is not tracked in infrastructure 100.

In contrast, at 415, if a bit chunk associated with the row number exists, at 425, controller 110 may locate the bit 144 value for the row number in the bit chunk. If a bit chunk for a given row number exists, then the row has been deleted. If a bit 144 within the bit chunk is set, then the row is deleted and garbage has been collected. At 430, controller 110 may examine the bit 144 corresponding to the row number to determine whether the bit is set. If the bit 144 is set (e.g., bit value=1) for the row number, then the row is invisible. That is, for deletions, the deletion timestamp value may signify "always_visible" meaning that the garbage collection procedure has occurred. At 435, controller 110 may return a "0" timestamp. The zero timestamp may represent the scenario where the row is deleted and garbage collected. This zero timestamp indicates that the row is an "invisible row" or a row that appears deleted to clients. In this scenario, reading the timestamp may not require examining transient timestamp accessor 132.

Returning to 430, if controller 110 recognizes that the bit chunk exists but the bit 144 is not set, controller 110 execute 440 and retrieve the transient timestamp block 134 associated with the row number. At 445, controller 110 may locate the entry corresponding to the row number in the transient timestamp block 134 using the row number as the hash key value. At 450, controller 110 may then extract the timestamp using the hash key value (e.g., the row number). In an embodiment, controller 110 may retrieve the sparse timestamp block 124 identifier and offset value stored in the transient timestamp block 134. Controller 110 may then retrieve the timestamp from the corresponding sparse timestamp block 124 at the indicated offset index.

Having obtained the timestamp value, controller 110 may return the timestamp stored in the sparse timestamp block 124. This timestamp may have been stored in the slot associated with the transient timestamp block 134 entry.

Additional Operations for Infrastructure 100

This section details addition operations that controller 110 may perform in the context of infrastructure 100.

Figure 5:
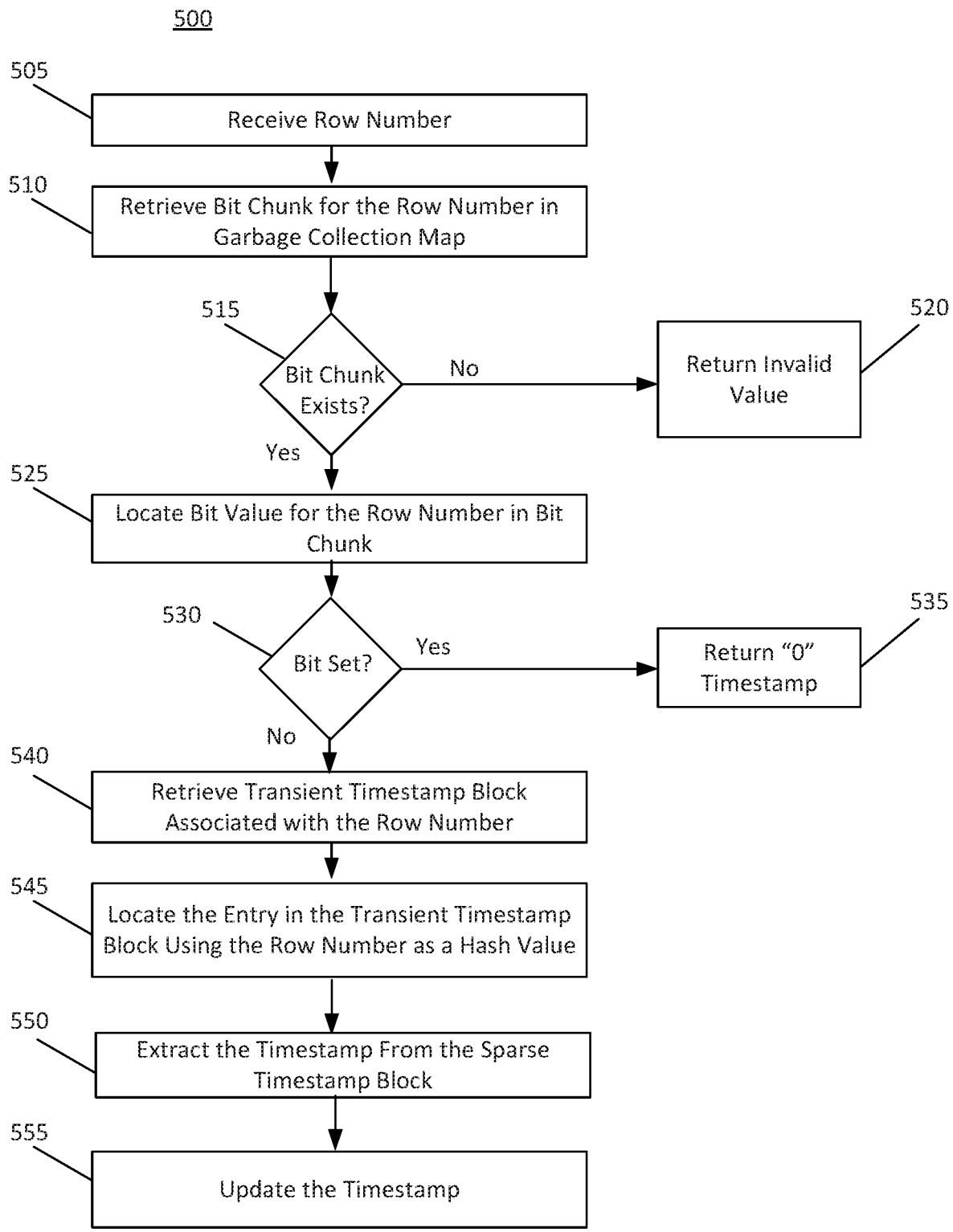
FIG. 5 depicts a flowchart illustrating a method for updating a timestamp, according to some embodiments.

In an embodiment, controller 110 may update the timestamp value for a given row. FIG. 5 depicts a flowchart illustrating a method 500 for updating a timestamp, according to some embodiments. For example, to update a timestamp, controller 110 may have previously written a timestamp value in a sparse timestamp block 124. A client may request to edit or modify this timestamp value. This editing may occur in some post-commit, cleanup, undo, and/or reset operations that update the timestamp value.

Controller 110 may receive a row number for updating. Controller 110 may then determine a deletion timestamp corresponding to the time that the update is received. Controller 110 may then utilize the transient tracking vector 130 to determine the transient timestamp block 134 including the row number. Controller 110 may then retrieve the hash value associated with the row number, retrieving the corresponding sparse timestamp block 124 identification and offset. Controller 110 may then utilize the block identification and offset to access the sparse timestamp entry in sparse timestamp block 124. Controller 110 may then update the timestamp value to a new timestamp value corresponding to the row number. In an embodiment, controller 110 may insert a timestamp of zero which may represent a cleanup operation. Controller 110 may set a bit 144 and/or bit chunk in garbage collection map 140 for the cleaned row number. The cleanup operation may be a garbage collection operation.

In an embodiment, controller 110 may insert an invalid timestamp value, such as, for example, a maximum range timestamp value. For example, the timestamp value may be "0xFFFFFF" and/or a value representing an infinity number. This value may represent an "undo" and/or "rollback" operation of the deletion operation. In an embodiment, when controller 110 reads this timestamp at a later time, controller 110 may recognize that the timestamp may include a designated invalid timestamp. Controller 110 may then recognize that an undo operation may have occurred at the particular database row.

In an embodiment, after updating a timestamp with an invalid value, controller 110 may remove the block identifier and offset from the corresponding transient timestamp block 134. In an embodiment, removing the sparse timestamp block 124 information may avoid hash conflicts by successive deletion operations on the same row. In an embodiment, to remove the transient timestamp block 134 entry, controller 110 may identify the appropriate transient timestamp block 134 using transient tracking vector 130. Controller 110 may then identify the corresponding row number within the transient timestamp block 134. Controller 110 may then erase the entry associated with the row number. Erasing the block identification and offset information may include writing null and/or zero values into the corresponding row number. Controller 110 may write a maximum timestamp value (e.g., a maximum integer value) in a timestamp section. The memory associated with the erased hash entry of transient timestamp block 134 may be tracked in the arena allocator of the transient timestamp block 134 and may be used for successive insertions into transient timestamp block 134.

In an embodiment, to update a timestamp, controller 110 may execute a procedure similar to method 400 depicted in FIG. 4. In an embodiment, controller 110 may perform, 405, 410, 415, 420, 425, 430, 435, 440, 445, and 450 as depicted in FIG. 4 and similarly depicted as 505, 510, 515, 520, 525, 530, 535, 540, 545, and 550 in FIG. 5. To perform the update operation, after extracting the timestamp using the hash value at 550, controller 110 may update (i.e., undo, post-commit, cleanup, and/or another update operation) the timestamp value extracted at 555. The update may include updating the timestamp value stored in the sparse timestamp block 124. In an embodiment where the update includes a cleanup operation, controller 110 may set the corresponding bit 144 in garbage collection map 140.

In an embodiment, controller 110 may utilize transaction based garbage collection. This procedure may mark rows associated with a transaction as "always_visible" based on its commit timestamp and the minimum read commit timestamp of infrastructure 100. This garbage collection procedure may be referred to as a cleanup operation of committed transactions. In an embodiment, this cleanup operation may differ from a table level garbage collection process. The cleanup operation may process the rows based on the row-number associated with an undo log of records of transactions.

The cleanup operations may utilize a minimum timestamp threshold for garbage collection. In this case, the cleanup operation may indicate that any timestamp below a threshold is assumed to be deleted. In this case, the cleanup operation may, for example, update deletion timestamps below a certain threshold and mark the deletion timestamp as zero. Controller 110 may then set the bit associated with the given row number in garbage collection map 140.

In an embodiment, controller 110 may perform a table level garbage collection operation. To perform the table level garbage collection, controller 110 may scan the timestamp values associated with data stored in a database. Controller 110 may replace identified timestamps with an "always_visible" identifier for identified rows. These identified rows may include timestamp values below a minimum read commit timestamp threshold. In an embodiment, when a controller 110 identifies a timestamp value below the threshold, controller 110 may assume that the timestamp value is a null or zero value.

In an embodiment, controller 110 may perform a table level garbage collection using sparse timestamp blocks 124. In an embodiment, controller 110 uses sparse timestamp blocks 124 instead of transient timestamp blocks 134. Using transient timestamp blocks 134 may lead to an expensive use of system resources relative to using sparse timestamp blocks 124 due to the traversal of the rows of transient timestamp accessor 132. Using sparse timestamp memory 122 may allow controller 110 to directly retrieve the row numbers that include timestamps.

In an embodiment, to perform the table level garbage collection, controller 110 may read a persistent block queue to determine the sparse timestamp blocks 124 including row numbers and timestamps. The persistent block queue may be a separate element of infrastructure 100 configured to queue sparse timestamp blocks 124. For each sparse timestamp entry from the first slot to the number of entries in the block, controller 110 may: prepare a page associated with the block for modification; extract the timestamp from the sparse timestamp entry; perform post-commit operations by writing an actual timestamp value in the sparse timestamp entry if post-commit operations are needed; replace the timestamp with an "always_visible" if the timestamp value is less than or equal to a snapshot timestamp; dirty the page associated with the block; and set the bit in garbage collection map 140 associated with the row number. Controller 110 may perform these operations for each sparse timestamp block 124 of sparse timestamp memory 122. Controller 110 may identify the appropriate blocks by examining the persistent block queue.

Figure 6:
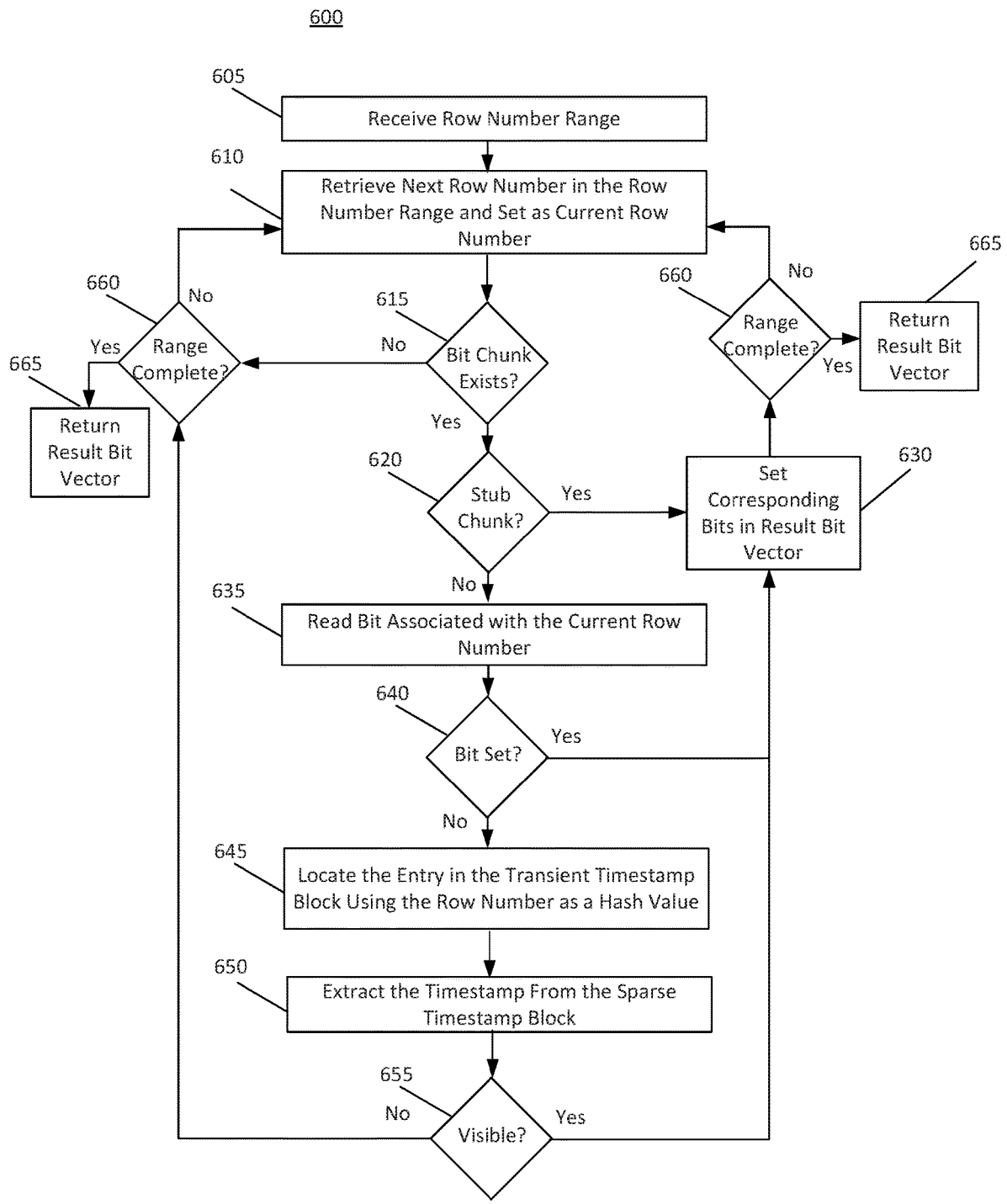
FIG. 6 depicts a flowchart illustrating a method for generating a list of deleted rows, according to some embodiments.

In an embodiment, controller 110 may generate a list of deleted rows using infrastructure 100. FIG. 6 depicts a flowchart illustrating a method 600 for generating a list of deleted rows, according to some embodiments. The list of deleted rows may be a list of row numbers of the database or table indicated the deleted rows of the database or table. In an embodiment, the list may be a vector of bits representing the rows. Controller 110 may generate this list in response to a client request. In an embodiment, the list may be a bitmap and/or a result bit vector where the rows having deletions visible to a client may include set bits. That is, if the delete timestamp is less than or equal to a snapshot timestamp of a thread accessing the database, then the bit will be set. This list generation may efficiently utilize infrastructure 100 and sparse timestamp blocks 124 by using garbage collection map 140 to avoid hash lookups. In an embodiment, the list generation process may perform has lookups only in cases where one or more bits of the garbage collection map 140 has not been set to zero. In an embodiment, utilizing infrastructure 100 may improve the response time for a query requesting a list of deleted rows.

In an embodiment, to generate the list of deleted rows, controller 110 may receive a starting row number and/or an ending row number. In an embodiment where controller 110 may be executing method 600, controller 110 may receive a row number range at 605. The range may be continuous, discrete, and/or a combination of continuous and discrete row numbers. In an embodiment, controller 110 may check the rows of the database without being provided a starting and ending row by a client requesting a list. At 610, controller 110 may retrieve the next row number in the row number range and set the next row number as the current row number. This may represent an iterative approach to generating the list of deleted rows. At 610, controller 110 may also determine whether the current row number is a bit chunk boundary using a vector associated with garbage collection map 140. The bit chunk boundary may be a starting row number of a bit chunk of garbage collection map 140. In an embodiment, a bit chunk may be a collection of bits 144 representing a collection of rows. A bit chunk may represent a contiguous set of row numbers.

At 615, controller 110 may determine if a bit chunk corresponding to the current row number exists. If no bit chunk exists, then controller 110 may determine whether the controller 110 has completed checking the row numbers of the range provided at 605. At 665, if controller 110 has completed the checking of the range, controller 110 may return the result bit vector to the requesting client. If controller 110 has not checked all of the row numbers of the provided range, controller 110 may return to 610 to retrieve the next row number in the range. Controller 110 may also designate the current row number as the starting row number associated with the next bit chunk.

If a bit chunk exists, at 620, controller 110 may determine whether the bit chunk is a stub chunk. In an embodiment, garbage collection map 140 may be represented as a vector of bit chunks. In this case, a stub chunk may be a read-only bit chunk where all bits 144 of the bit chunk are set to 1. For example, a bit chunk associated with row numbers [1024-2047] may include all bits that are set. This may signify that all the rows of the bit chunk are deleted and garbage collected. In this case, the bit chunk at slot 1 of the vector of bit chunks may be replaced with a stub chunk. The memory associated with the bit chunk may be re-used in future bit operations due to the stub chunk status. For example, with further insertions into the bit vector which may result in the allocation of bit chunks that can use the space.

Controller 110 may check whether the bit chunk is a stub chuck in garbage collection map 140. A stub chunk may be a bit chunk where the row numbers associated with the bit chunk contain garbage collected timestamp values. These garbage collected timestamp values may be zeros. In this scenario, the stub chunk may be set as a "one" value. In an embodiment, if controller 110 encounters a stub chunk when reading a vector associated with garbage collection map 140, controller 110 may treat the rows associated with the bit chunk as visible. For example, if controller 110 finds that slot 1 of garbage collection map 140 includes a stub chunk, controller 110 may recognize that rows [1024-2047] are garbage collected deletions. Controller 110 may recognize that rows [1024-2047] are invisible. At 630, controller 110 may mark the rows [1024-2047] as deleted and may proceed further until the final row number of the range. In this manner, controller 110 may set the corresponding bits in the result bit vector 630 to designate the rows as deleted.

Returning to the scenario where controller 110 is generating a list of deleted rows, controller 110 may check if bit chunks are stub chunks in garbage collection map 140. Controller 110 may read bits 144 indicating a stub chunk. If a bit chunk is a stub chunk based on a bit 144 reading, controller 110 may set the bits from the current row number to the end row number associated with the bit chunk.

For example, a bit chunk may represent rows [1024-2047] and slot 1 of a garbage collection map 140 may represent whether the bit chunk is a stub chunk. If controller 110 identifies that slot 1 is set (i.e., the bit chunk is a stub chunk), controller 110 may set the bits from 1024 to 2047 in a result deletion bit vector to be provided to a client. Controller 110 may then proceed with row 2048.

If the current row being checked is not a bit chunk boundary, but a bit chunk exists and is not a stub chunk, at 635, controller 110 may check the bit 144 value for the current row number in garbage collection map 140. At 640, controller 110 may determine whether the bit 144 is set. If the bit 144 value is set, then controller 110 may set the bit in a result bit vector and continue to the next row number. Controller 110 may set the corresponding bit in the result bit vector at 630 to indicate that the row has been deleted.

In an embodiment, if the bit is not set, controller 110 may read timestamp values associated with identified deleted rows. At 645, controller 110 may locate the entry in a transient timestamp block 134 using the row number as a hash value. Controller 110 may then extract the timestamp from the corresponding sparse timestamp block at 650 using the hash entry. The has entry may be of the form (row number, {sparse timestamp block identifier, offset in the sparse timestamp block}).

In an embodiment, at 655, controller 655 examines the timestamp to determine whether the timestamp value is visible. The timestamp value may be visible if the timestamp value is less than or equal to a current snapshot transaction timestamp (i.e., a value written by the same thread requesting information). In this case, controller 110 may set the bit in the result bit vector at 630. Controller 110 may then check the next subsequent row at 610. If the timestamp stored in the sparse timestamp block 124 is greater than the current snapshot timestamp, at 655, controller 110 may determine that the timestamp is not visible. In this manner, controller 110 may not mark the current row as deleted in the result bit vector. Instead, controller 110 may retrieve the next row number in the row number range at 610.

At 660, after controller 110 has set a bit in the result bit vector at 630, determined that a bit chunk does not exist at 615, and/or determined that the timestamp is not visible at 655, controller 110 may determine whether the controller 110 has completed checking the row numbers of the range provided at 605. If controller 110 has not checked all of the row numbers of the provided range, controller 110 may return to 610 to retrieve the next row number in the range. At 665, if controller 110 has completed the checking of the range, controller 110 may return the result bit vector to the requesting client. In this case, the client may receive a bit vector that lists the deleted rows.

Various embodiments may be implemented, for example, using one or more well-known computer systems, such as computer system 700 shown in FIG. 7. One or more computer systems 700 may be used, for example, to implement any of the embodiments discussed herein, as well as combinations and sub-combinations thereof.

Computer system 700 may include one or more processors (also called central processing units, or CPUs), such as a processor 704. Processor 704 may be connected to a communication infrastructure or bus 706.

Computer system 700 may also include user input/output device(s) 703, such as monitors, keyboards, pointing devices, etc., which may communicate with communication infrastructure 706 through user input/output interface(s) 702.

One or more of processors 704 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 700 may also include a main or primary memory 708, such as random access memory (RAM). Main memory 708 may include one or more levels of cache. Main memory 708 may have stored therein control logic (i.e., computer software) and/or data.

Computer system 700 may also include one or more secondary storage devices or memory 710. Secondary memory 710 may include, for example, a hard disk drive 712 and/or a removable storage device or drive 714. Removable storage drive 714 may be a floppy disk drive, a magnetic tape drive, a compact disk drive, an optical storage device, tape backup device, and/or any other storage device/drive.

Removable storage drive 714 may interact with a removable storage unit 718. Removable storage unit 718 may include a computer usable or readable storage device having stored thereon computer software (control logic) and/or data. Removable storage unit 718 may be a floppy disk, magnetic tape, compact disk, DVD, optical storage disk, and/any other computer data storage device. Removable storage drive 714 may read from and/or write to removable storage unit 718.

Secondary memory 710 may include other means, devices, components, instrumentalities or other approaches for allowing computer programs and/or other instructions and/or data to be accessed by computer system 700. Such means, devices, components, instrumentalities or other approaches may include, for example, a removable storage unit 722 and an interface 720. Examples of the removable storage unit 722 and the interface 720 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 700 may further include a communication or network interface 724. Communication interface 724 may enable computer system 700 to communicate and interact with any combination of external devices, external networks, external entities, etc. (individually and collectively referenced by reference number 728). For example, communication interface 724 may allow computer system 700 to communicate with external or remote devices 728 over communications path 726, which may be wired and/or wireless (or a combination thereof), and which may include any combination of LANs, WANs, the Internet, etc. Control logic and/or data may be transmitted to and from computer system 700 via communication path 726.

Computer system 700 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 700 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 400 may be derived from standards including but not limited to JavaScript Object Notation (NON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 700, main memory 708, secondary memory 710, and removable storage units 718 and 722, as well as tangible articles of manufacture embodying any combination of the foregoing. Such control logic, when executed by one or more data processing devices (such as computer system 700), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 7. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer implemented method, comprising:
   receiving an indicator of an operation performed on a database row;
   determining a timestamp corresponding to the operation and a row number associated with the database row;
   sequentially analyzing a sparse timestamp block to determine a next available memory slot; and
   storing the row number and the timestamp in the next available memory slot.

2. The computer implemented method of claim 1, further comprising:
   hashing a sparse timestamp block identifier corresponding to the sparse timestamp block and an offset value corresponding to the next available memory slot in a transient timestamp block.

3. The computer implemented method of claim 2, wherein the hashing further comprises:
   storing the sparse timestamp block identifier and offset value in a transient timestamp block slot corresponding to the row number associated with the database row.

4. The computer implemented method of claim 2, wherein the hashing further comprises:
   deallocating a memory portion of the transient timestamp block in response to a deletion from the transient timestamp block; and
   reallocating the memory portion to store a different sparse timestamp block identifier and a different offset value.

5. The computer implemented method of claim 1, further comprising:
   determining that a garbage collection process has occurred on the database row;
   replacing the timestamp stored in the next available memory slot with a null value; and
   in response to replacing the timestamp, setting a bit corresponding to the database row in a garbage collection bitmap.

6. The computer implemented method of claim 5, further comprising:
   receiving a request for a list of visible database rows affected by the operation;
   reading the garbage collection bitmap to determine that the bit corresponding to the database row is set; and
   adding the database row to the list.

7. The computer implemented method of claim 1, wherein the operation performed on the database row is a deletion or an insertion.

8. The computer implemented method of claim 1, further comprising:
   receiving a row number;
   retrieving a bit chunk corresponding to the row number;
   locating a bit value corresponding to the row number in the bit chunk;
   determining that the bit value is set;
   in response to determining that the bit value is set, retrieving a transient timestamp block corresponding to the row number;
   locating an entry in the transient timestamp block using the row number as a hash value;
   extracting, from the entry in the transient timestamp block, an identifier for the sparse timestamp block and an offset value corresponding to the memory slot storing the timestamp; and
   extracting the timestamp from the memory slot.

9. A system, comprising:
   a memory; and
   at least one processor coupled to the memory and configured to:
   receive an indicator of an operation performed on a database row;
   determine a timestamp corresponding to the operation and a row number associated with the database row;
   sequentially analyze a sparse timestamp block to determine a next available memory slot; and
   store the row number and the timestamp in the next available memory slot.

10. The system of claim 9, wherein the at least one processor is further configured to:
    hash a sparse timestamp block identifier corresponding to the sparse timestamp block and an offset value corresponding into the next available memory slot in a transient timestamp block.

11. The system of claim 10, wherein to hash the sparse timestamp block identifier and the offset value, the at least one processor is further configured to:
    store the sparse timestamp block identifier and offset value in a transient timestamp block slot corresponding to the row number associated with the database row.

12. The system of claim 10, wherein to hash the sparse timestamp block identifier and the offset value, the at least one processor is further configured to:
    deallocate a memory portion of the transient timestamp block in response to a deletion from the transient timestamp block; and
    reallocate the memory portion to store a different sparse timestamp block identifier and a different offset value.

13. The system of claim 9, wherein the at least one processor is further configured to:
    determine that a garbage collection process has occurred on the database row;
    replace the timestamp stored in the next available memory slot with a null value; and
    in response to replacing the timestamp, set a bit corresponding to the database row in a garbage collection bitmap.

14. The system of claim 13 wherein the at least one processor is further configured to:
    receive a request for a list of visible database rows affected by the operation;
    read the garbage collection bitmap to determine that the bit corresponding to the database row is set; and
    add the database row to the list.

15. The system of claim 9, wherein the operation performed on the database row is a deletion or an insertion.

16. The system of claim 9, wherein the at least one processor is further configured to:

receive a row number;
retrieve a bit chunk corresponding to the row number;
locate a bit value corresponding to the row number in the bit chunk;
determine that the bit value is set;
in response to determining that the bit value is set, retrieve a transient timestamp block corresponding to the row number;
locate an entry in the transient timestamp block using the row number as a hash value;
extract, from the entry in the transient timestamp block, an identifier for the sparse timestamp block and an offset value corresponding to the memory slot storing the timestamp; and
extract the timestamp from the memory slot.

17. A non-transitory computer-readable device having instructions stored thereon that, when executed by at least one computing device, cause the at least one computing device to perform operations comprising:
receiving an indicator of an operation performed on a database row;
determining a timestamp corresponding to the operation and a row number associated with the database row;
sequentially analyzing a sparse timestamp block to determine a next available memory slot; and
storing the row number and the timestamp in the next available memory slot.

18. The non-transitory computer-readable device of claim 17, the operations further comprising:
hashing a sparse timestamp block identifier corresponding to the sparse timestamp block and an offset value corresponding to the next available memory slot in a transient timestamp block.

19. The non-transitory computer-readable device of claim 18, wherein the hashing comprises:
storing the sparse timestamp block identifier and offset value in a transient timestamp block slot corresponding to the row number associated with the database row.

20. The non-transitory computer-readable device of claim 18, wherein the hashing comprises:
deallocating a memory portion of the transient timestamp block in response to a deletion from the transient timestamp block; and
reallocating the memory portion to store a different sparse timestamp block identifier and a different offset value.

21. The non-transitory computer-readable device of claim 17, the operations further comprising:
determining that a garbage collection process has occurred on the database row;
replacing the timestamp stored in the next available memory slot with a null value;
in response to replacing the timestamp, setting a bit corresponding to the database row in a garbage collection bitmap;
receiving a request for a list of visible database rows affected by the operation;
reading the garbage collection bitmap to determine that the bit corresponding to the database row is set; and
adding the database row to the list.

22. The non-transitory computer-readable device of claim 17, wherein the operation performed on the database row is a deletion or an insertion.

23. The non-transitory computer-readable device of claim 17, the operations further comprising:
receiving a row number;
retrieving a bit chunk corresponding to the row number;
locating a bit value corresponding to the row number in the bit chunk;
determining that the bit value is set;
in response to determining that the bit value is set, retrieving a transient timestamp block corresponding to the row number;
locating an entry in the transient timestamp block using the row number as a hash value;
extracting, from the entry in the transient timestamp block, an identifier for the sparse timestamp block and an offset value corresponding to the memory slot storing the timestamp; and
extracting the timestamp from the memory slot.

\* \* \* \* \*